United States Patent

Chiow-Shing

[11] Patent Number: 5,935,316
[45] Date of Patent: Aug. 10, 1999

[54] LIGHT SAND-GRAVEL AND ITS METHOD OF PRODUCTION

[76] Inventor: Chiou Chiow-Shing, No. 13, Lane 5, Lung Cheng 1st St., Pingzen, Taoyuan, Taiwan

[21] Appl. No.: 09/110,227

[22] Filed: Jul. 6, 1998

[51] Int. Cl.$^6$ .............................. C04B 14/02; C04B 20/04
[52] U.S. Cl. ............................ 106/681; 106/811; 106/817
[58] Field of Search ..................................... 106/811, 817, 106/681

[56] References Cited

PUBLICATIONS

JAPIO Patent Abstract No. JP404119952A, abstract of Japanese Patent Specification No. 4–119952, Apr. 1992.
WPIDS Abstract No.78–86741A, abstract of Japanese Patent Specification No. 53–121819, Oct. 1978.
WPIDS Abstract No. 97–007391, abstract of Japanese Patent Specification No. 08–277155, Oct. 1996.

*Primary Examiner*—Anthony Green
*Attorney, Agent, or Firm*—Rosenberg, Klein & Bilker

[57] ABSTRACT

A light sand-gravel and its production methodology is provided. The light sand-gravel has a specific gravity within the range of 0.4~2.0. It has an expanded inner structure with porosity to approximate an evacuated space and a vitreous surface. The production methodology involves the preheating of sorted and dried rock materials, subsequent heating and heat soaking processes in a converter preset with four stages of temperature control. Stage 1 provides for preheating. Stages 2 and 3 provides heating and Stage 4 provides heat soaking to produce a light sand-gravel aggregate with a particular specific gravity.

3 Claims, 2 Drawing Sheets

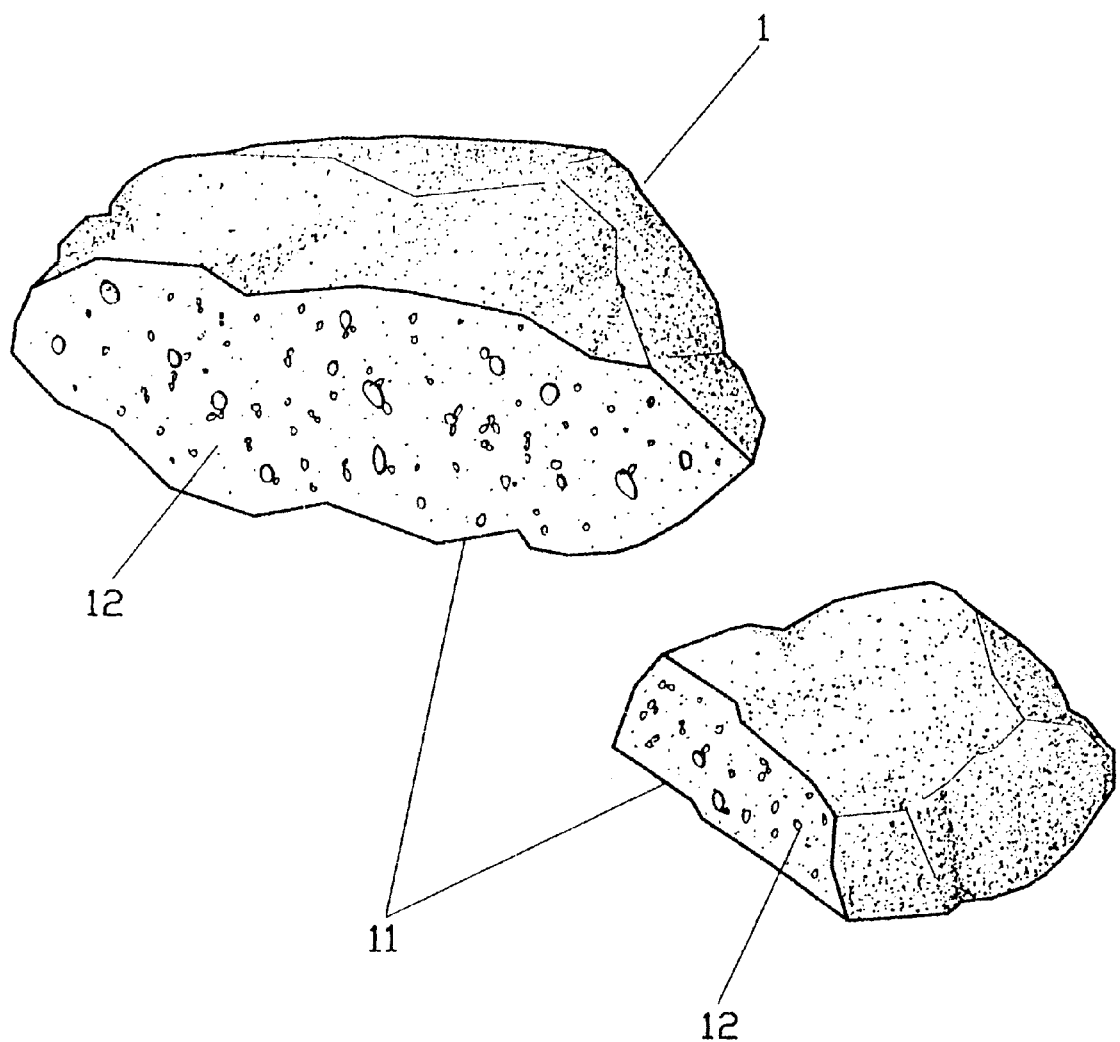
F I G. 1

LIGHT SAND-GRAVEL AND ITS METHOD OF PRODUCTION

BACKGROUND OF THE INVENTION

1. Field of the Invention

The present invention relates to a light sand-gravel for general construction usage and its production methodology. More particularly, the present invention is directed to a light sand-gravel of various specific gravities, depending on its end use, namely, that with a specific gravity of 1.5~1.8 is for a heavy construction purpose, a specific gravity of 1.2~1.5 is for a general building purpose, and a specific gravity of 0.4~1.2 is for a light partition. With a specific gravity greater than 1.8, such is for a special purpose. The production methodology involves a sand-gravel that when properly treated and applied as the aggregate for light concrete, that concrete has greater strength but a small er specific gravity compared to that of the prior art.

2. Prior Art

Rock materials when used for a construction purpose generally are in the forms of flagstones and granules. The former is used as a finishing material and usually as an external surface for flooring installations, while the latter, depending on its grain size and specific gravity (strength), is usually used as a grading or concrete aggregate. The source of the granules is mostly gravel from riverbeds, and the specific gravity of such granules is always greater than 2.6. The inherited weight of such granules when used in the site foundation or the structure of a building with a low number of floors is directly borne by the earth bed, and has negligible, if not minimal, impact upon the overall structure or cost. However, the very limited availability of land has forced buildings to be constructed as high-rise buildings. Weight and cost of materials for such buildings have developed into the bottleneck in the structural design thereof.

So far, weight of construction material has been a very critical element in the design of buildings. Therefore, a wall panel to be used for the external curtain wall or a partition usually requires a light-weight and sufficient strength of the composite construction, in most cases. Such a design is found with the disadvantages of a complicated preparation, higher cost and significant waste material due to mass pre-casting of units followed by a cutting operation, resulting in problems in subsequent processes.

A wall panel comprised of light-weight foam cement is another type of curtain wall. In strict terms of weight, foam cement board is lighter than the general RC wall, but the wall panel erected with foam cement board is vulnerable to impact. A nail, hook or an object hanging upon the foam cement board will cause the nail or hook to be pulled off.

There is an absence of a better substitute for the partition materials on the market. The strength of the material, depending on the requirements, governs the selection of material, though such material may be very expensive and heavy, or lighter and cheaper, but at the expense of strength. Those light partition materials available on the market are far from an efficient alternative for a structural aggregate, either for the consideration of strength or cost.

Although in the field of the emergence industrial ceramics, ceramics may be used as a structural or construction material, its specific gravity remains at the higher end of the spectrum (above 3). Factors such as the highly demanded purity of some of the ceramic material and demanding quality contribute to an even higher cost for those materials. In addition, the production of ceramic material is very limited. Ceramic materials may give the advantage of excellent strength, industrial ceramics can only be applicable to certain special products. So far, industrial ceramics are used only for traditional tile, ground tile, and light cement, but never as an aggregate.

Furthermore, rock materials have been comprehensively applied in foundation grading in the construction industry. However, should such foundations form a cluster on alluvial land, the buildings thereon will cause a gradual land subsidence. Indeed, use of a grading material with a heavier specific gravity is one of the main factors for such land subsidence.

This invention solves the problems observed in the prior art, by seeking from the natural world for an alternative to substitute for the existing building materials containing crushed rock. The substitute must be "hard yet light", cheaper and allow easy access. However, all existing mineral stones fail such efforts since they are hard and solid. The only hard artificial building material known up to now is that of ceramics, but its specific gravity is greater than 3 and the production cost is high. Most of the "light gravels" available on the market are light but with insufficient strength. Granules made from natural mineral stones are limited in supply and very expensive, which prevents them from being used on an economic scale, and they are available in a narrow range of specific gravity. Thus, they are very limited in their application. As for those grains made from slag or other metallurgic residuals, such at best have the property of a smaller specific gravity. When granulated with traditional cement or other cementitious materials, or stirred to become granulated, and then heated to harden, such granules remain with a greater specific gravity (i.e. very limited changes in its volume), poor strength, limited supply and application, and higher production cost.

The formation of a structure of light granules is very difficult to produce in the natural world (or more appropriately, such formation has not yet been discovered so far). Whereas, natural resources of mineral stones are constantly under high temperature and pressure, the same conditions that exist when they are released (e.g. an eruption from volcano). Once released, they are subject to a sudden decrease in temperature. Therefore, hard rocks with a vitreous surface, though they may be found with certain natural mineral stones, are formed either from lava or volcanic dust and have the characteristics of being hard and solid, great specific gravity, and brittle, making them not a good light granule for construction applications.

SUMMARY OF THE INVENTION

The primary purpose of the present invention is to provide a light sand-gravel and its production methodology. More particularly, the present invention is directed to a sand-gravel with a specific gravity falling within the range of 0.4~2.0 (inclusive), an expanded interior and with a vitreous surface for construction applications in a high-rise structure, foundation grading and a light partition structure.

The light sand-gravel of the present invention has a puffed interior which approximates evacuated spaces and an extremely hard vitreous surface. Such properties are made possible by means of dividing the burning process for the present invention into three stages, respectively, preheating, higher temperature heating and heat soaking. Four stages are provided for temperature control in a converter. Stage 1 temperature control, also a pre-temperature control, is provided for the preheating process, allowing a consistent temperature and firm temperature rise of the granules. Stage 2 and 3 temperature controls, intermediate and primary temperature controls are respectively provided for the higher temperature heating process, permitting the achievement of the level of temperature required for the formation of the vitreous surface of the granules. Stage 4 temperature control, a post-temperature control, maintains the consistent and well distributed heating of the interior of the granules to promote expansion, even when exposed to a sudden drop in temperature. Expansion from the heated metallic constituents in those granules prop up other constituents in the interior of those granules after a given time of heat soaking and indicates such have expanded, while their vitreous surface starts to stabilize to conclude the expansion, and produce a hollow structure approximating an evacuated space. Furthermore, the formation of the vitreous surface is mainly attributable to the heating process; the stage of providing a higher temperature (i.e., the stage of primary temperature control) is only part of the converter process. Wherein the time for the granules to pass through such stage is limited, so that energy yielded at the higher temperature only manages to be delivered and accumulated in the vicinity of the surface of granules, while such energy is not sufficient to cause vitrification of the interior of those granules. Finally, upon entering Stage 4, i.e., the post-temperature control of the heat soaking process, the ambient temperature has been decreased and the energy delivered is only sufficient to foam the interior of the granules, but never to vitrify the interior of granules.

Related objects and advantages of the present invention will be apparent form the following description.

BRIEF DESCRIPTION OF THE DRAWINGS

FIG. 1 is a sketch drawing of the present invention; and

DESCRIPTION OF THE PREFERRED EMBODIMENT

Figure 2:
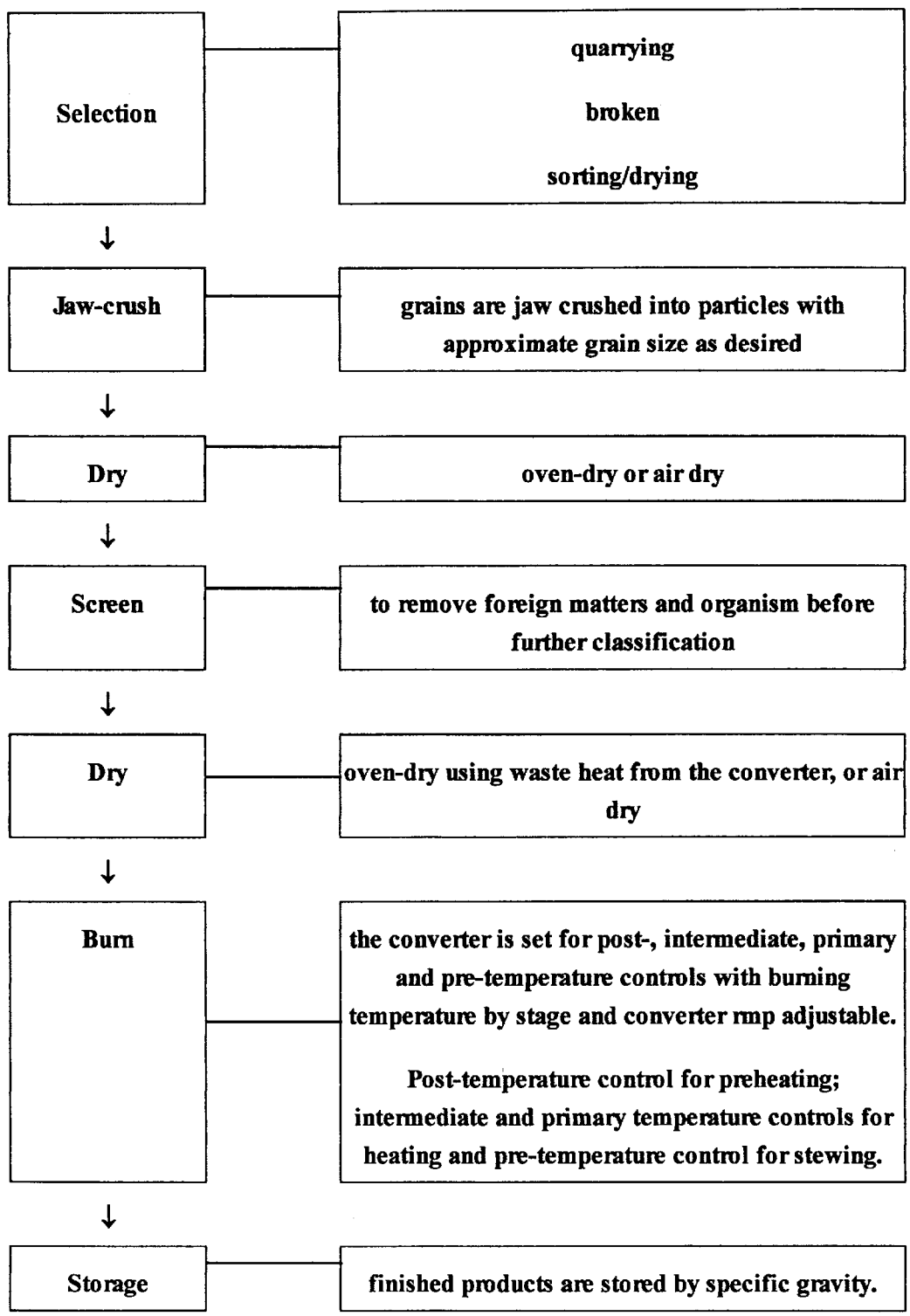
FIG. 2 is a block chart of the process of the present invention.

Referring to FIG. 1, the light sand-gravel (1) of the present invention exhibits an expanded structure (12), and a vitreous surface (11), with its specific gravity falling within the range of 0.4~2.0 (inclusive). In practice, an aggregate with a specific gravity of 0.4~1.2 is used for light partitions, a specific gravity of 1.2~1.5 for general construction, and a specific gravity of 1.5~1.8 for heavy construction. Material with a specific gravity not greater than 1.0 is even more appropriate for use as a decoration material for pre-fabricated partitions, and that with a specific gravity of 1.8~2.0 is ideal for special purposes, such as for the making of an earth anchor.

As illustrated in FIG. 2, the light sand-gravel (1) of the present invention is comprises of shale, mud-stone, and slate with the specific gravity of the raw stone approximating 2.6 and its composition as follows:

1. aluminum oxide, $Al_2O_3$ (approximately 15%~25%);
2. ferric oxide, $Fe_wO_3$ (approximately 2%~13%);
3. magnesium oxide, MgO (approximately 1%~3%);
4. kalium, $K_2O$ (approximately 4%~8%);
5. sulfur trioxide, $SO_3$ (approximately 1%~6%);
6. carbon, C (approximately 2%~4%);
7. sodium oxide, $Na_2O$ (approximately 2%~4%); and
8. silica, $SiO_2$ and others.

The process involves the following steps:

1. selection: quarrying, breaking, screening, and sorting for open storage. The materials must be dried before sorting and jaw-crushing;

2. jaw-crushing: allotted materials are jaw crushed to the proper grain size depending on the end purpose;

3. drying: oven or air dried, the grains that were jaw crushed are left completely dried;

4. screening: foreign matter and organisms are removed and the materials are classified;

5. drying: selected grains are dried (oven drying is recommended by taking advantage of the waste heat form the converter);

6. burning: grains with the desired specific gravity are put through the heating and heat soaking stages in the converter under a proper rpm and temperature designed for four stages of temperature control. Namely, the pre-temperature control (preheating), the intermediate and primary temperature controls (higher temperature heating) and the post-temperature control (heat soaking) and the whole burning process (converter) is divided into three stages of preheating, heating and heat soaking; and 7. storage: finished grains are stored by the classification of specific gravity.

The operation of the converter, the formation of grains with various specific gravity, and temperature control conditions are described as follows:

Temperature Control of Converter:

A. Pre-temperature control: refers to the pre-requisite of incomplete drying of grains or the oven-dry process;

B. Intermediate temperature control: refers to the maintenance of a consistent ambient temperature of the grains to secure a uniform expansion of the aggregate;

C. Primary temperature control: refers to the temperature rise given only when required to promote firm quality growth; and D. Post-temperature control: refers to the temperature maintenance process to promote consistent expansion for the grains completed with the burning process, which is very similar to that of rice cooking, at its final stage.

Burning conditions depend on the specific gravity range given in the present invention, as follows:

For grains input with specific gravity of 0.5~1.2—the converter rpm is set at 300 rpm, pre-temperature control is set to 502° C.±10° C., intermediate temperature control is set to 875° C.±10° C., primary temperature control is set to 1125° C.±10° C. and post-temperature control is set to 860° C.±10° C. As a result, a finished product of light sand-gravel having a specific gravity within the range of 0.4~1.2 is available and ideal to be incorporated with other materials for making top selected sound insulation, and sound absorbing and noise reduction materials, particularly for projects at airports, slaughter houses, and freeways and for acoustic walls.

For grains input with specific gravity of 1.2~1.5, the converter is set at 300 rpm for the motor, 150 rpm for the differential, and 2 rpm for the barrel. Pre-temperature control is set to 501° C.±10° C., intermediate temperature control is set to 874° C.±10° C., primary temperature control is set to 1125° C.±10° C. and post-temperature control is set to 850° C.±10° C. As a result, a light sand-gravel is produced that achieves 60%~80% of complete burning, with a specific gravity of 1.2~1.5 and grain size of ½"~3/16" for the compound material. The specific gravity is determined by grain size in conjunction with rpm of the converter, and by the dry specific gravity of the grain. The material produced is a very excellent material for the construction of general buildings.

For grains input with specific gravity of 1.5~1.8, the converter is set at 300 rpm for the motor, 150 rpm for the differential, and 2 rpm for the barrel. Pre-temperature control is set to 500° C.±10° C., intermediate temperature control is set to 650° C.±10° C., primary temperature control is set to 1115° C.±10° C. and post-temperature control is set to 587° C.±10° C. As a result, a light sand-gravel is produced that achieves 40%~60% of complete burning, with a specific gravity of 1.5~1.8 and a grain size of ½"~3/16" for the compound material. The specific gravity is determined by grain size in conjunction with rpm of the converter, and by the dry specific gravity of the grain. The material produced is a top selected material for construction purposes.

Grains produced as above described are respectively suitable for the following applications:

(1) For grains with specific gravity of 1.5~1.8, such can be applied to construction of dams, sanitation sewers, blow forts, super strength engineering projects (450 kg/cm$^2$+).

(2) For grains with specific gravity of 1.2~1.5, such can be applied to general building projects (350 kg/cm$^2$+).

(3) For grains with specific gravity of 1.2~0.4 and below, such can be applied to non-structural building elements (light aggregate partition wall).

When compared with the prior art (including the natural rock aggregates), the present invention is found having:

1. smaller specific gravity, falling between 0.4~2.0 (inclusive) with the formed concrete slab having its specific gravity not greater than 1.0;

2. higher strength, application for a curtain wall may reach above 300 kg/cm$^2$;

3. higher hardness;

4. more capable of resisting heat;

5. better sound insulation, 40 dB noise reduction being possible with a sound insulation board (i.e. free of reverberation);

6. higher seismic property, a light and leaven-fabric forms inside the grains to give higher earthquake endurance; and 7. better heat isolation and heat resistance providing better heat dispersion due to the leaven-fabric formed and porosity of the grains.

The expanded and hollow interior approximating evacuated spaces, light-weight and vitreous surface of the grains of the present invention contribute to those advantages described above. The vitreous surface gives the grains a hard and rough quality. The expanded and hollow interior approximating an evacuated space means that there is poor heat transmission and poor sound transmission, to yield excellent properties of heat-resistance, heat insulation, sound insulation and earthquake endurance.

I claim:

1. A light sand-gravel for use as an aggregate produced by a process comprising the steps of:
    providing granules of a raw material selected from the group consisting of shale, mudstone, and slate, said granules having an initial specific gravity of 2.6; and,
    applying heat to said granules in stages to form grains having an expanded and hollow interior, a vitreous surface, and a specific gravity within a range of 0.4–2.0.

2. The light sand-gravel as recited in claim 1 where said step of applying heat to said granules includes applying heat in a preheating stage, applying heat in a plurality of higher temperature heating stages, and applying heat in a post-heating stage having a temperature less than said higher temperature heating stages.

3. A method for producing a light sand-gravel having a specific gravity within a range of 0.4–2.0, comprising the steps of:
    (a) providing granules of a raw material selected from the group consisting of shale, mudstone, and slate;
    (b) crushing said granules;
    (c) drying said crushed granules; and,
    (d) heat processing said dried crushed granules to obtain an aggregate with a specific gravity within a range of 0.4–2.0, said heat processing including a preheating step, a higher temperature heating step, and a heat soaking step, wherein:
        aggregate having a specific gravity within a range of 0.4–1.2 is produced with a preheat temperature of 502° C.±10° C., higher temperature heating in a pair of heating stages at respective temperatures of 875° C.±10°C. and 1125° C.±10° C., and heat soaking at a temperature of 860° C.±10° C.;
        aggregate having a specific gravity within a range of 1.2–1.5 is produced with a preheat temperature of 501° C.±10° C., higher temperature heating in the pair of heating stages at respective temperatures of 874° C.±10° C. and 1125° C.±10 °C., and heat soaking at a temperature approximating 850° C.±10° C.; and,
        aggregate having a specific gravity within a range of 1.5–1.8 is produced with a preheat temperature of 500° C.±10° C., higher temperature heating in the pair of heating stages at respective temperatures of 650° C.±10° C. and 1115° C.±10° C., and heat soaking at a temperature approximating 587° C.±10° C.

* * * * *